J. G. P. THOMAS.
ELECTRICAL POWER TRANSMISSION.
APPLICATION FILED JAN. 24, 1910.
968,290.
Patented Aug. 23, 1910.
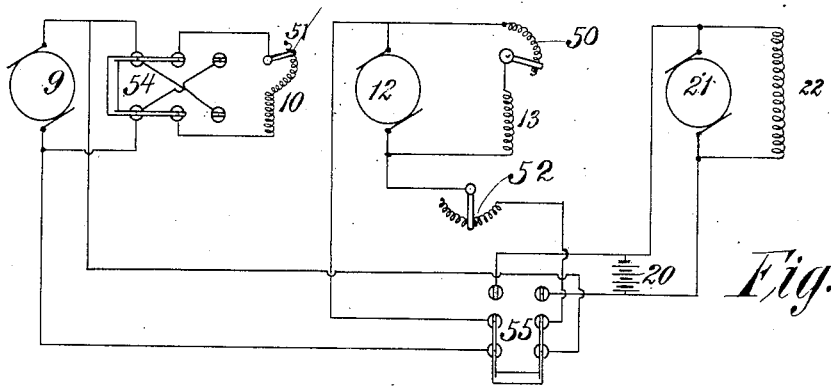
*Fig: 3.*
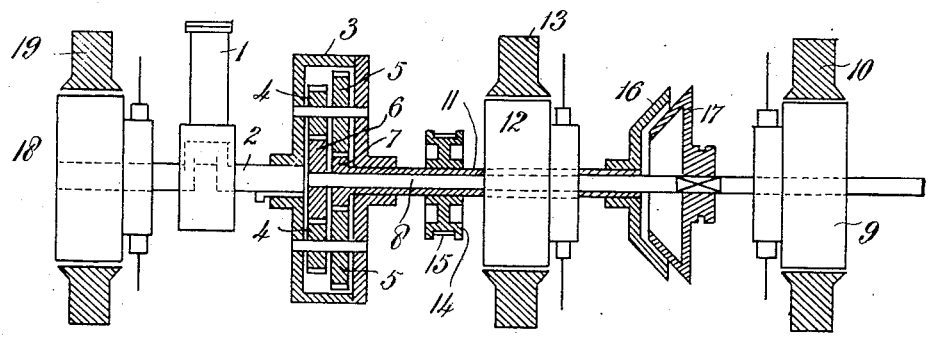
*Fig: 1.*
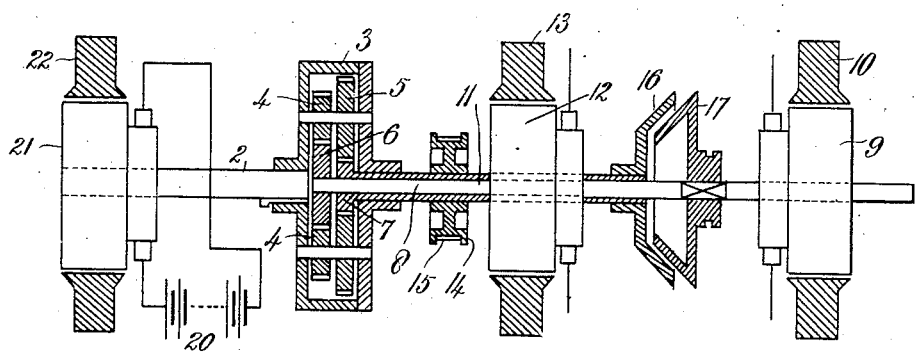
*Fig: 2.*
Witnesses.
E. M. Moore.
L. E. Arkley.
Inventor
John Godfrey Parry Thomas.
per Hanks Anneleman
Attorney

UNITED STATES PATENT OFFICE.

JOHN GODFREY PARRY THOMAS, OF CHISWICK, ENGLAND.

ELECTRICAL POWER TRANSMISSION.

968,290.  Specification of Letters Patent.  Patented Aug. 23, 1910.

Application filed January 24, 1910. Serial No. 539,708.

*To all whom it may concern:*

Be it known that I, JOHN GODFREY PARRY THOMAS, a subject of the King of Great Britain, residing at 21 Ennismore avenue, Chiswick, in the county of Middlesex, England, engineer, have invented new and useful Improvements in Electrical Power Transmission, of which the following is a specification.

This invention relates to the class of electromechanical transmission systems described in my Patent No. 948,436 patented February 8th, 1910, in which the prime motor and two dynamo electric machines are mechanically interconnected through three members of a gearing so that the speed of each machine is determined by the speeds of the remaining two.

The object of the present invention is to modify systems of this kind so as particularly, to suit them to the driving of trains, whether on road or rail. When such a system is applied to a train the dynamo connected with the wheels is replaced by several separate machines distributed over the various vehicles so that one or more axles on all or on most of the vehicles may be a driving axle. It is obvious then that the transmission of power electrically to the dynamo electric machines thus distributed may involve a serious loss particularly when the power so transmitted is large, and moreover the transmission of the large currents is in itself a matter of difficulty. According to the present invention means are provided upon the front or main vehicle for eliminating the distributed dynamos at times when the power required to be transmitted would become particularly large.

In the accompanying drawings—Figure 1 illustrates the application of the invention to a system in which an internal combustion engine is the prime motor, and Fig. 2 its application to a system having a battery as its source of energy. Fig. 3 is a diagram of the connections used in conjunction with the apparatus of Fig. 2.

In Fig. 1, 1 is the prime motor driving through the shaft 2 a gearing which comprises a casing 3 supporting sets of double planet pinions 4, 5, the set of smaller pinions gearing with the sun wheel 6 and the larger pinions with the sun wheel 7. Of these sun wheels the former is connected to the shaft 8 which extends to the road wheels and carries the armature 9 of a dynamo electric machine 9, 10, 10 indicating the field; the latter is on a sleeve 11 carrying the armature 12 of a dynamo electric machine 12, 13. Upon the sleeve is a drum 14 with a brake band 15 by means of which it may be held stationary, and clutch parts 16, 17 on the sleeve 11 and shaft 8 respectively permit these two parts to be engaged together. These are the members constituting the system described in my earlier patent, and according to the present invention there is added to them a dynamo electric machine comprising the armature 18, and field 19, the former being secured directly on the shaft 2 of the prime motor 1.

In the system of transmission described for example in my Patent No. 948,436 patented Feb. 8th, 1910, the regulation is effected in the following manner: The vehicle on which the parts are mounted is started by giving the field 13 a small excitation, the field 10 being strongly excited. To increase the speed the field 13 is strengthened and the field 10 weakened, until a condition of affairs is reached in which the armature 12 is rotating very slowly in a strong field and the armature 9 quickly in a very weak field. After the armature 12 has been held still mechanically by the use of the brake device 14, 15, if this device is employed, further increase of speed is obtained by reversing the field 10, so that the machine 9, 10 acting as a generator drives the machine 12, 13, as a motor. Strengthening of the field 10 in this reverse direction and weakening of the field 13 continues the increase of speed until the shaft 8 is rotating at the same speed as the sleeve 11, when the clutch parts 16 and 17 may be brought together to avoid the electrical transmission of power between the machine 9, 10 and 12, 13.

According to the present invention the machine 18, 19 is substituted for the machine 9, 10 at the stage when the latter reverses its functions, the machine 9, 10 being put on open circuit or otherwise rendered inactive. The speed increase is effected in the corresponding manner by increasing the field 19 until the shaft 8 and sleeve 11 attain a common speed. If desired, of course, this speed may be exceeded, (the clutch parts 16, 17 being left disengaged) by decreasing the field 13. Where this system is applied to the driving of a train the prime motor 1 and the machine 12, 13 and 18, 19, should be upon a single vehicle, while the machine 9, 10 might be represented by several motors distributed over the train. It will be seen that in such a case the use of the extra machine 18, 19 causes a considerable saving in the transmission of power electrically at the higher speeds. Even on a single vehicle, however, the modified system has some utility for it is possible by its use to dispense with the clutch 16, 17 since at top speed only one half instead of the whole of the power is being transmitted electrically, and therefore the losses in transmission, to avoid which the clutch was employed in the older systems, are not so serious.

In addition to its function as a generator in connection with the transmission of power, the machine 18, 19 may be used for other purposes. A battery of accumulators can be carried on the locomotive, and these coupled to the machine 18, 19 will serve to supply power for starting up the prime motor 1 or to assist it when the vehicle is ascending steep gradients. The machine 18, 19 may also be used for charging up the accumulators when the full power of the engine 1 is not required at the road wheels.

Where as in Figs. 2 and 3 a battery 20 is the source of power driving the vehicle by supplying an ordinary motor 21, 22, the invention may be applied still more easily because there is no need to add an extra dynamo electric machine. A little consideration will show that the machine 18, 19 in Fig. 1 has simply the purpose of enabling the prime motor 1 to supply the energy required by the machine 12, 13, when it has reversed its function. The source of energy now being the battery there is no need for any transformation of the form of energy, but the battery 20 can itself be directly connected to the machine 12, 13. To imitate the action of the machine 18, 19, it would be necessary, when the current in the armature 12 is to be reversed, to connect the battery to this armature cell by cell, so as to gradually increase the voltage applied just as is effected by increasing the field 19 from zero. In practice, however, the complication of switches necessary for such gradual addition is hardly justified. The machine 12, 13 is therefore allowed to reverse its function and regulation is continued as in the older systems until the voltage of the machine 9, 10 which is applied to the machine 12, 13 is equal to that of the battery. At this point the former machine is replaced by the battery at one step. Naturally the change of connections requisite for this purpose would be effected like all the other changes in the system by means of a controller of ordinary type.

In the case of Fig. 2 also the system has the same advantage as before over the older system when used on a single vehicle, namely that the clutch 16, 17 becomes unnecessary, and in this case not merely unnecessary but quite useless.

It is of advantage when the prime source of energy is electrical to so design the machines 9, 10, and 12, 13, that their voltage equals that of the supply before the two machines have attained a common speed. As soon as the change of connections described has been made the vehicle has really a direct drive, and a further increase of speed can now be attained with this direct drive by weakening the field 13, this increase extending, if desired, beyond the point of common speed.

It will be noted that the system of Fig. 2 is regenerative, for the passage from a higher to a lower speed is in general accompanied by a return of energy to the source, at least if the fields 10, 13 are not series wound. At start, i. e., in the low speed condition, shown, the circuit passes from lower brush of armature 9 to the bottom left hand contact of switch 55, switch arm, left middle contact of switch 55, machine 12, 13 switch arm, right lower contact, and upper brush of armature 9. The field 13 is strengthened by cutting out the rheostat 50, and field 10 is weakened by the insertion of the rheostat 51. The time then comes for reversal; to effect which, switch 54, is thrown over, so that the polarity of machine 9, is changed. (This is obviously the same, in effect, as changing over the connections between the two armatures and leaving the sign of the fields and the polarity unaltered.) Field 10 is then again built up and field 13 is weakened by reversely operating the rheostats 51, 50. When the voltage of machine 9, 10, becomes equal to that of battery 20, switch 55 is thrown over. Machine 9 is then on open circuit, while the machine 12 is connected directly to battery 20, the circuit being as follows:—upper brush of armature 12, middle left contact of switch 55, switch arm, upper left contact, negative pole of battery 20, positive pole, upper right contact of switch 55, switch arm, middle right contact, and lower brush of armature 12. Rheostat 52 may be employed to vary the current between the machines or the supply from battery 20. In this Fig. 3 machine 9 has to be disconnected from machine 12 before the latter is joined to the batteries 20, i. e., a circuit carrying current has to be interrupted.

What I claim is:—

1. In an electro-mechanical system of power transmission, the combination with a prime motor, of two dynamo electric machines, gearing connecting said motor and machines so that the speed of each machine depends on that of the others, a separate source of electrical power and means for connecting one of said machines to the other or to the separate source.

2. In an electromechanical system of power transmission, the combination with a prime motor, of two dynamo electric machines, gearing connecting said motor and machines so that the speed of each machine depends on that of the others, a battery, means for causing one machine to generate current and supply the other, and means for subsequently disconnecting the machines and joining the generator to the battery.

3. In an electromechanical system of power transmission, the combination with an electrical source of power, of an electrical prime motor, two dynamo electric machines, gearing connecting said machines together and to the prime motor so that the speed of each machine is dependent on that of the other two, and means for connecting one of said dynamo electric machines to the other or to the electrical source of power.

4. In an electro-mechanical system of power transmission, the combination with a prime motor, of two dynamo electric machines, gearing connecting said motor and machines so that the speed of each machine depends on that of the other two, means for enabling one of said machines to generate current and supply the other electrically, and means for disconnecting said machines and for supplying electrical energy to one of the separate machines.

In testimony whereof I have signed my name to this specification in the presence of two subscribing witnesses.

JOHN GODFREY PARRY THOMAS.

Witnesses:
ALFRED STILL,
WILLIAM HOYLE.